United States Patent Office 2,968,565
Patented Jan. 17, 1961

2,968,565
CHOCOLATE CHIFFON

William A. Mitchell, Lincoln Park, N.J., and William C. Seidel, Monsey, N.Y., assignors to General Foods Corporation, White Plains, N.Y., a corporation of Delaware No Drawing. Filed Nov. 18, 1958, Ser. No. 774,579

10 Claims. (Cl. 99—139)

This invention relates to a new whipping composition for use as a chocolate chiffon food product or pie filling.

Chiffon, when employed as a flavored dessert product, such as pie filling, should evidence a high degree of overrun, good peaking, and fineness and uniformity of aerated cellular structure. As distinguished from other high solids whips such as marshmallow, chiffon is characteristically composed of solids in the order of 30–40% and is considered a low solids content whip when compared with a creme whip, for example, which exhibits a much heavier viscous texture. As an example of the distinction between the two types of whips the use of various gummy materials, such as Irish moss or carboxymethyl cellulose which offer stability to a high solids sugar whip, is not considered desirable in chiffon type whips because of the need for a delicate, reticular aerated structure, which chiffon whips in fact are more in the nature of a foam system. Chiffon, in addition, is characterized by having a uniform non-tacky separation or cleavage when sectioned into wedges or slices. When viewed in cross section, a cut of chiffon should exhibit a fine capillary network of uniformly arranged cells of delicate texture. Therefore, it is seen that the light foamy texture of chiffon is not essential to high density cohesive whips, such as cremes or frappe products, and the problem of foam stability found in chiffons is not as critical in whips having a more dense and viscous composition.

In the formulation of a chocolate type chiffon the addition of a cocoa flavoring agent to the whip to impart the necessary chocolate flavor gives rise to a suppression of the foam with the resultant instability and destruction of the fine cellular network so essential to the formulation of a light delicately frothy material capable of being readily sectioned into wedges without undue cohesion. This suppression of froth formation in chiffon mixes containing cocoa may be compensated for by the addition of two to three times the normal amount of untreated gelatin employed. However, gelatin is quite expensive and causes an increase in the effort required to obtain a satisfactory whip as well as an increase in the beating time necessary to achieve an acceptable chiffon. Moreover, unlike a chiffon system of the fruit flavored type, a chocolate chiffon formulation lacks an acidic material such as an edible organic acid which tends to enhance setting of the foam. The phosphate salt present in a fruit chiffon mixture in the presence of such an organic acid, and a low pH for the system, will precipitate the protein materials of the formulation such as gelatin and degraded soy protein, thereby achieving a partial set of the foam produced. In a chocolate chiffon mix, however, which contains no acidic components and necessarily has a higher pH say, 5.5 to 7.0, the precipitation of the protein ingredients by the phosphate salt does not occur to the degree necessary to set the foam.

It is an object of the present invention to provide a less costly composition for chocolate chiffon which can be whipped to produce a satisfactory stable product exhibiting the characteristic delicate cellular network of chiffon without any increase in effort or time of whip in a system having a high pH to yield a chocolate chiffon of acceptable quality.

In accordance with the present invention there is provided a new whipping composition for the production of chocolate chiffon possessing a stable delicate foamy structure and capable of being whipped in a short time with a minimum amount of effort while containing a foam stabilizer and a high pH and which avoids the use of massive quantities of either an untreated gelatin setting agent or a protein foam former.

The present invention is based on the discovery that the use of a particular phosphated gelatin, more specifically the reaction product of gelatin with a metaphosphate salt, when employed in a chocolate chiffon whipping composition, otherwise subject to foam depression, will stabilize and support said foam system. The whipped chiffon foam so produced exhibits a high degree of overrun and delicate reticular texture characteristic of an entirely satisfactory chiffon. A chocolate chiffon can therefore be provided at a great saving in the cost of ingredients by the reduction in the level of untreated gelatin and hydrolyzed soy protein, otherwise required to obtain a stable product.

It has now been found that by reacting normal untreated gelatin with a metaphosphoric acid or salt thereof at a pH of less than 4 and adding the complex formed to the chocolate chiffon mixture a more complete protein precipitation resulting in a stabilized and partially set proteinaceous foam is effected. It has also been found that the addition of such phosphated gelatin provides a satisfactory chiffon textured, chocolate flavored product in spite of the foam suppressing action of the fat-containing cocoa ingredient in the absence of the acidic protein precipitating substance.

The invention preferably comprises compounding cocoa powder, polymetaphosphated gelatin, partially degraded soy protein, and a sugar. Most preferably, dried pregelatinized starch is also added to the composition. The cocoa powder used in the present composition is that derived from the roasting of cacao beans and grinding and expressing from the beans cocoa butter to yield a cocoa press cake having a fat content less than 20%, and more particularly, a butter fat content ranging from 12–14%. The cocoa powder is derived by grinding the press cake to a fine powder. By virtue of the employment of phosphated gelatin in conjunction with the cocoa, partially degraded soy protein, and sugar, it has been found that the tendency of the fatty constituents of the cocoa powder to suppress foam development is arrested to the extent that massive quantities of gelatin or hydrolyzed soy protein, which would normally be required to overcome this effect, can be greatly reduced as well as the necessity for the addition of an organic acid setting agent, as in instant fruit chiffon mixtures, can be obviated.

The gelatin which is employed in the manner of this invention may be that of a number of different types of gelatin, including that obtained from tanner's stock, ossein, pigskin, etc. Although the Bloom of the gelatin which is employed may vary widely, it is preferred to use gelatins having a Bloom of 150 to 250 and preferably 180 to 220. The level of gelatin which would normally be employed varies somewhat with the Bloom of the gelatin, the higher Bloom gelatins being required at a generally lower level. The pH of the gelatin solution employed may fall within the range of 1.5–7, but preferably within the range of 2–4.

Gelatins obtained by acid treatment provide the best gelatin for the formation of the gelatin reaction product. Preference for the acid extracted gelatin as a reactant for the formation of phosphated gelatin is based on its yielding a gelatin having amine groups which react with the metaphosphoric acid or acid salt to form an insoluble reaction product which apparently possesses a phosphate prosthetic group attached to the protein molecule. The reaction is not believed to involve mere salt formation, but rather a protein reaction product is formed from which the prosthetic group may not easily be removed.

The partially degraded soy protein may be obtained by the acid, alkaline, or enzymatic digestion of proteinaceous extracts of soybean. For the purposes of the present invention it is preferred that the hydrolyzate of soy protein be enzymatically partially degraded so as to contain polypeptides, oligopeptides, and amino acids. For the purposes of the present invention soy protein which has been enzymatically hydrolyzed with pepsin to from 10-18% is preferred, although trypsin and pancreatin have been successfully employed. A typical proteinaceous whipping agent and the analysis thereof is as follows:

| | |
|---|---|
| Total nitrogen | percent 9.9 |
| Amino nitrogen | do 1.1 |
| Ash | do 13.4 |
| Moisture | do 4.6 |
| pH (1% solution) | 5.5 |

Total nitrogen is determined by the Kjeldahl method and amino nitrogen is determined by the method described by David M. Breenberg in "Amino Acids and Proteins," published by Charles C. Thomas, Springfield, Illinois, 1951, on pages 80, 81, and 246.

*Example I*

The preferred range of proportions of ingredients in the present composition is as follows:

| Ingredients: | Parts/weight (gms.) |
|---|---|
| Sugar | 50-70 |
| Cocoa powder | 5-15 |
| Partially degraded soy protein | 3-10 |
| Phosphated gelatin | 5-10 |
| Dried pregelatinized starch | 1-8 |

The function of the cocoa utilized in this invention is to impart chocolate flavor and natural color to the product. However, the level of cocoa necessary to give chocolate chiffon the proper flavor ordinarily destroys chiffon product stability and lengthens the whipping time and effort necessary when such product is prepared with water, homogenized or non-homogenized milk.

The partially hydrolyzed soy protein employed provides the aeration and foam volume needed by the chiffon. Its role is primarily that of a whipping agent. The decreased level of hydrolyzed soy protein tends to lengthen the whipping time necessary to achieve a satisfactory whip.

The role of phosphated gelatin in the formulation is to provide foam stability and give the product the eating quality desirable in a satisfactory chocolate chiffon. The phosphated gelatins employed in the present system are prepared by the addition of a solution of metaphosphoric acid or sodium polymetaphosphate to an aqueous solution of 22-25% concentration of gelatin, acidifying to a pH of about 2.7 with concentrated sulfuric acid or other mineral acids such as hydrochloric acid or nitric acid, drying the reaction product formed, and grinding the phosphated gelatin by conventional means. The operable metaphosphates are those which will precipitate protein. The term "metaphosphoric acid" as herein employed is intended to include within its scope acids which upon ionization form metaphosphate ions, which when released, will react with gelatin to form gelatin metaphosphate. The term "metaphosphate" as herein employed is intended to include salts, which upon hydrolysis, form acids which ionize to yield metaphosphoric ions which react with gelatin to form gelatin metaphosphate. These terms embrace (a) metaphosphoric acid per se and metaphosphates per se, and (b) polymetaphosphates such as tri-, tetra-, and hexametaphosphates and their derivative acids. The phosphate employed may also be an ammonia or an alkali metal salt such as sodium hexametaphosphate, sodium trimetaphosphate, or sodium tetrametaphosphate. The salt may be converted to the corresponding acid by appropriate reaction, preferably by contact with a suitable cation exchange resin, which acts so as to replace the cation of the salt with a hydrogen atom.

The solution of the gelatin complex may be reduced to powdered form by means of spray drying or drum drying. For example, the gelatin reaction product may be spray dried in a conventional dryer comprising a cylindrical tower ten feet in diameter and thirty feet in height. The dryer is of the cocurrent type wherein warmed drying air is introduced at the top of the dryer and is removed at the bottom of the dryer, the solution of the gelatin complex being introduced through a spray drying nozzle located in the center of the dryer approximately 2.5 feet from its top and adapted to direct the atomized solution downwardly in a conical spray pattern. The gelatin solution is fed under pressure of approximately 1500 pounds per square inch (gauge) and leaves the nozzle at approximately 135° F. As the solution leaves the spray nozzle, it forms a sheet which rapidly breaks down into filaments and then individual droplets. After formation of the individual droplets, they pass downwardly through a zone described by an outer and inner shield. The outer shield comprises a twelve-inch diameter cold air duct terminating in a conical shield which flares downwardly and outwardly from the nozzle and describes a truncated cone nine inches in height and twenty-five inches in base diameter, the upper extremity of the shield being at substantially the same elevation as the spray nozzle. A smaller or diffusing conical shield is located within and at the same level as the outer shield and is concentric with the large outer shield and describes a truncated cone nine inches in height, eight inches in top diameter, and twenty inches in base diameter. Cool air is passed through the above-mentioned twelve-inch duct and downwardly through the top of the inner shield and the zone between the inner and outer shields to effect drying of the gelatin spray. In the operation of the spray dryer a warm air mass at a temperature in the order of 550° F. is introduced by suitable means at a rate of 3000 cubic feet per minute at the top of the dryer and is directed downwardly past the outer conical shield. Simultaneously, cool air at a temperature of about 70° F. is introduced by suitable means through the twelve-inch duct and into the area surrounding the spray pattern at about 1000 cubic feet per minute or at a velocity sufficient to prevent entrance of warm air into the zone immediately surrounding the spray pattern. By reason of the relatively slow rate of evaporation taking place in the cold air zone proximate to the point of atomization, droplet formation is assured. After formation of the individual droplets, they pass downwardly with the drying air and are completely dried into spherical particles before reaching the bottom of the spray tower. The resulting product obtained is a particulate, free flowing material having a density of approximately six pounds per cubic foot and a particle size range of substantially 50-150 microns.

The dried pregelatinized starch ingredient acts as a binder for the foam system and prevents separation of the ingredients prior to refrigeration. Moreover, the presence of dried pregelatinized starch contributes the necessary body for the chocolate chiffon yielding a sensation of fullness as the chiffon is consumed.

Various sugars, such as dextrose, sucrose, maltose, levulose, lactose, and fructose, provide the chiffon formulation with the sweetness desired to round off the chocolate flavor. Saccharide mixtures, such as dried corn syrup solids, may also be employed. The preferred sweetening agent is dextrose, although sucrose has also proven to be very satisfactory.

The invention may be further illustrated by the following example:

Example II

A chocolate chiffon was prepared from the following ingredients which were dry blended together:

| Ingredients: | Parts/weight (gms.) |
|---|---|
| Dextrose | 59.05 |
| Cocoa powder | 9.00 |
| Partially degraded soy protein | 3.50 |
| Phosphated gelatin | 6.80 |
| Dried pregelatinized starch | 3.50 |
| Chocolate color | 2.00 |
| Flavor | 1.20 |

The above dry blended ingredients are placed in a large, deep mixing bowl and one-half cup boiling water is then added and the ingredients hydrated by thorough mixing. One-half cup cold water is then added and beating conducted at high speed in an electric mixer is carried out for about one minute or until the product is quite foamy. Addition of one-third cup sugar then follows and the product is beaten for one to three minutes until the filling stands in peaks. The mixture is then poured into a cooled, baked 8-inch shell and chilled in the refrigerator for two hours until the gel is set. The chocolate chiffon so prepared has a cellular consistency, does not appear rubbery when cooled, and exhibits a rich chocolate flavor. The product, in addition, exhibits the delicate, foamy quality of chiffon and has good eating qualities and mouth feel.

While the above example discloses the preparation with water, it must be understood that either reconstituted skim milk or homogenized whole milk may also be employed. If one desires to use milk, the milk should be boiling when added to the dry ingredients for the formation of the most desirable product.

It will be understood that while the invention has been described in part by means of specific examples, reference should be had to the appended claims for a definition of the scope of the invention.

What is claimed is:

1. A composition for preparing chocolate chiffon which comprises cocoa powder, partially degraded soy protein, phosphated gelatin, and sugar.

2. A composition for preparing chocolate chiffon which comprises in combination cocoa powder, partially degraded soy protein, phosphated gelatin, sugar and dried pregelatinized starch.

3. A composition for preparing chocolate chiffon which comprises in combination cocoa powder, partially degraded soy protein, sugar, and the reaction product of gelatin and a metaphosphate.

4. A composition according to claim 3 wherein the metaphosphate is a polymetaphosphate.

5. A composition according to claim 4 wherein the polymetaphosphate is selected from the group consisting of polymetaphosphoric acids and alkali metal salts of polymetaphosphoric acid.

6. A composition for preparing chocolate chiffon which comprises in combination cocoa powder, partially degraded soy protein, sugar, dried pregelatinized starch, and the reaction product of gelatin and a metaphosphate.

7. A composition according to claim 6 wherein the metaphosphate is a polymetaphosphate.

8. A composition according to claim 7 wherein the polymetaphosphate is selected from the group consisting of polymetaphosphoric acids and the alkali metal salts of polymetaphosphoric acid.

9. A composition comprising the following ingredients in parts by weight:

| | |
|---|---|
| Sugar | 50–70 |
| Cocoa powder | 5–15 |
| Partially degraded soy protein | 3–10 |
| Phosphated gelatin | 5–10 |

10. A composition comprising the following ingredients in parts by weight:

| | |
|---|---|
| Sugar | 50–70 |
| Cocoa powder | 5–15 |
| Partially degraded soy protein | 3–10 |
| Phosphated gelatin | 5–10 |
| Dried pregelatinized starch | 1–8 |

References Cited in the file of this patent

UNITED STATES PATENTS

| 2,196,300 | Grettie | Apr. 9, 1940 |
| 2,444,241 | Beckel et al. | June 29, 1948 |
| 2,844,468 | Gunther | July 22, 1958 |

OTHER REFERENCES

"Everybody's Cookbook," by Lord, Revised Edition, Harcourt Brace and Company, New York, page 801.